Jan. 22, 1929.
F. W. GUNN
1,700,043
HOSE CLAMP
Filed Nov. 25, 1927
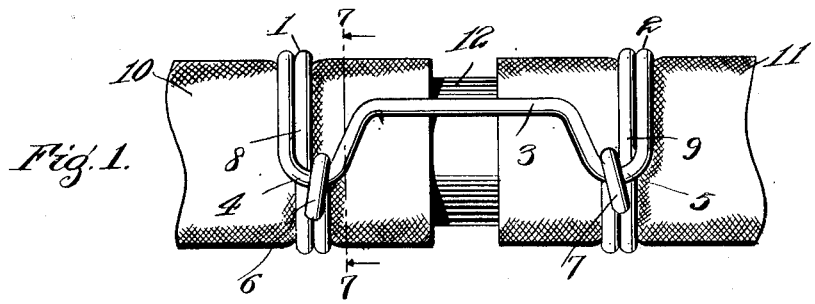
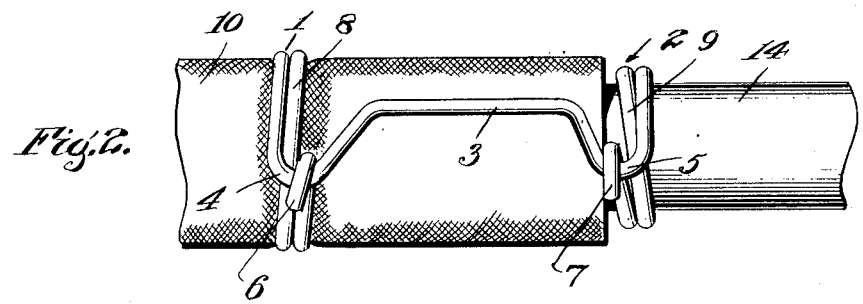
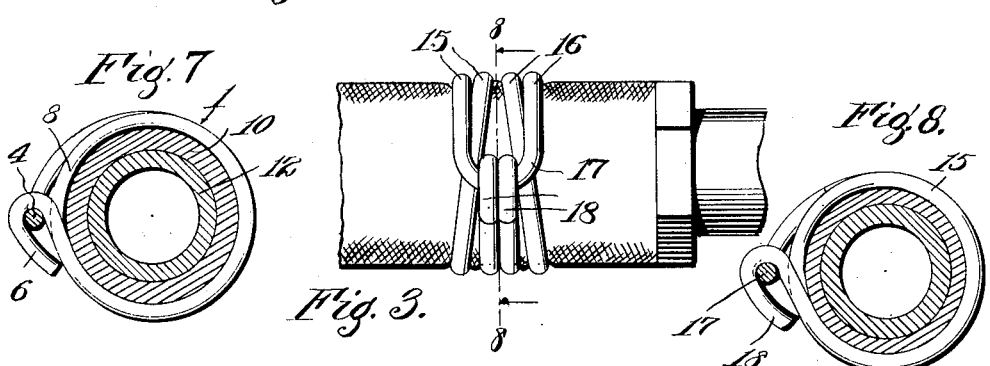
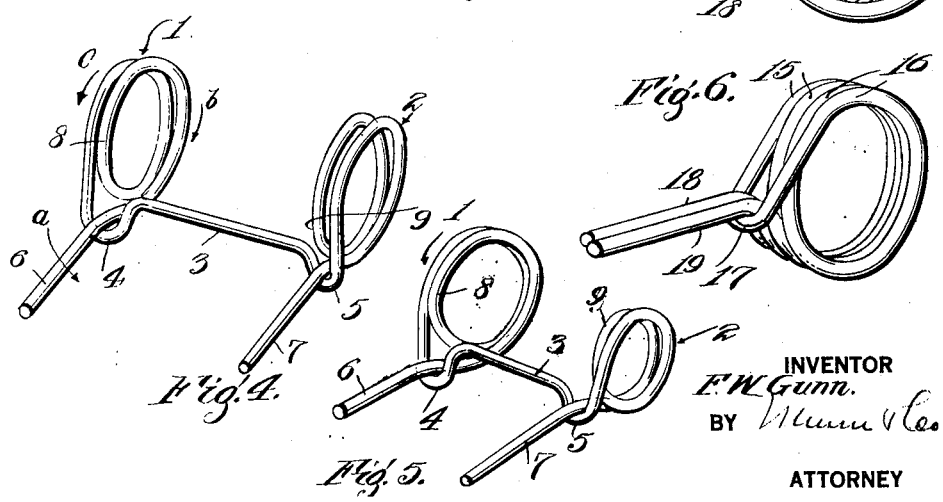
INVENTOR
F. W. Gunn.
BY
ATTORNEY Patented Jan. 22, 1929.

1,700,043

UNITED STATES PATENT OFFICE.

FRED WILLIS GUNN, OF BOSTON, MASSACHUSETTS.

HOSE CLAMP

Application filed November 25, 1927. Serial No. 235,650.

This invention relates to improvements in hose clamps and it consists of the structural arrangements and combinations herein described and claimed.

An object of the invention is to provide a wire hose clamp of which one of the outstanding features is the formation of the coils in such a manner that a wire extends completely around the hose thereby leaving no open spot beneath the lock at which a leak may occur.

Other objects and advantages appear in the following specification reference being had to the accompanying drawing in which, Figure 1 is a plan view of one form of the invention arranged to clamp confronting hose ends upon a connecting nipple, Figure 2 is a plan view of a second form of the invention arranged to clamp a single hose end upon a nipple, Figure 3 is a plan view of a third and further modified form of the clamp, Figure 4 is a perspective view of the clamp in Figure 1 in its original form, Figure 5 is a perspective view of the clamp in Figure 2 in its original form, Figure 6 is a perspective view of the clamp in Figure 3 in its original form, Figure 7 is a cross section on lines 7—7 of Figure 1, Figure 8 is a cross section taken on the line 8—8 of Figure 3.

Although many styles of hose clamps have hitherto been devised there are few, if any of a relatively simple construction, that actually can be made to grip the hose so tightly as to prevent the leakage of fluid at the point where the connection of the hose with the complementary nipple is made. The foregoing terminology (of the hose and nipple) is employed herein merely to note one of the applications with which the hose clamp may be used. It must be understood that the invention may be employed to clamp a hollow conductor other than a hose to a support other than a nipple.

It is the particular purpose of the hose clamp to apply the gripping effort to the hose under the point herein known as the lock, as well as to the remaining portions of the hose. This advantage, as well as the one afforded by the simplicity of the construction, makes the hose clamp attractive to a wide variety of uses.

Reference is first made to Figures 1, 2, 4 and 5 which illustrate hose clamps of particularly identical constructions as evidenced by similar reference characters, although the hose clamp in Figures 2 and 5 serve a purpose somewhat different from that of Figures 1 and 4. An appropriate length of wire is formed to produce a pair of coils 1 and 2. The mid-portion of the wire remains straight to provide a bridge 3 of appropriate length.

Prior to the formation of the coils the wire is bent into loops 4 and 5 through which the extremities 6 and 7 of the wire are passed as well shown in Figures 4 and 5. It is important to note that in each instance the coils include what is herein termed the cross over wires 8 and 9, the merits of which do not become apparent until the clamp is applied.

In Figure 1 it is proposed to secure the confronting ends of hose sections 10 and 11 upon a nipple 12. The coils 1 and 2, being originally sufficiently loose, are slipped into position as the members to be clamped are assembled. An appropriate tool is then used to draw the coils 1 and 2 together. The wire extremities 6 and 7 are bent down and over the loops 4 and 5 (Figs. 1 and 2), any unnecessary length of wire being cut off. This produces a lock. The important thing to observe is that the cross over wires 8 and 9 pass continuously beneath the lock thus making it possible to apply the sealing pressure at all points around the hose, especially under the lock which is usually the vulnerable point in many styles of hose clamps.

The particular formation of each coil provides a double wire continuously around the hose as clearly seen in any one of the four views mentioned. It is, of course, necessary to bring the extremities of the coils together at the loops, but this does not defeat the desired continuity of the double wires and application of the double wires. The double wire arrangement provides the important cross over wire which passes by the two coil extremities under the parts of such extremities constituting the lock.

Figure 2 illustrates a modification only to the extent that the coil 2 is made somewhat smaller than the coil 1, thus enabling the former to grip a pipe end 14. Here, confronting hose ends are not to be accounted for, the purpose of the particular modification of hose clamp being to secure a single hose end upon a pipe rather than confronting hose ends upon a connecting nipple.

Figures 3 and 6 exemplify a different form of the hose clamp, although the underlying principle is retained as will presently appear.

In effect this modified hose clamp is the same as the hose clamp in Figures 1, 2, 4 and 5 in condensed form, the pronounced bridge 3 being omitted.

The convolutions 15 will be recognized as very much like the coil 1 and the convolutions 16 as being like the coil 2. These coils terminate at one end in a common loop 17 which may be regarded as the equivalent of the bridge 3 in the foregoing modifications, and for the purpose of identification is to be known as the bridge.

Passing over the common loop or bridge 17 are the remaining extremities 18 and 19 of the convolutions 15 and 16. These are intended to be bent down over the loop 17 in securing the clamp upon a hose as shown in Figure 3 thus to produce the desired lock. It is again to be observed that the cross over wires are present, these being identified as the innermost wires of the convolutions 15 and 16.

The operation is readily understood. The mode of application of any of the various forms of clamps is obvious enough. Originally the loops 1 and 2 are relatively loose and in this condition are readily slipped upon the hose ends or upon a pipe as the case may be.

By use of a suitable tool or tools the wire extremities 6 and 7 are bent down over the loops 4 and 5, and cut to produce the lock. As the wire 6 (for example) is bent down over the loop 4 in the direction of the arrow $a$ in Figure 4 there will be a pull upon the adjacent convolution of the coil 1 in the direction of the arrow $b$. The resulting downward pressure upon the loop 4 will exercise a pull on the remaining and adjacent convolution of the coil in the direction of the arrow $c$. The two oppositely directed pulls serve to draw the cross over wire 8 tight at the very place where a fluid tight seal is required, namely under the point where the lock is ultimately made. Upon brief consideration of Figure 6 the reader will perceive at once that the same principle of application obtains with the form of the clamp illustrated thereby.

While the construction and arrangement of the improved clamp herein described and claimed is that of a generally preferred form, obviously modifications and changes may be made without departing from the spirit of the invention or the scope of the claims.

I claim:—

1. A clamp for the purpose described comprising a coil of wire including a convolution passing completely around the member to be clamped, the substantial remaining ends of the coil being bent in different directions to form a lock at a point over said convolution.

2. A clamp comprising a coil consisting of a wire extended substantially twice around the member to be clamped, one end of said wire being formed into a loop, the other end being bent over the loop to form a lock, the intermediate convolutions of said coil crossing under the lock and ensuring the continuity and clamping pressure under said lock.

3. A clamp for the purpose described comprising coils, each consisting of a plurality of convolutions of wire, substantial extremities of certain convolutions being connected by a bridge over which remaining extremities of the convolutions are passed and bent to form a lock, intermediate convolutions providing cross over wires under the lock.

4. A clamp for the purpose described comprising a coil consisting of convolutions of wire, one substantial extremity being bent to form a loop over which the remaining extremity passes and is bent to form a lock, the remaining continuous convolution passing under the lock to afford continuous application of the clamping pressure upon a member to be clamped.

Signed at Reachville in the county of Suffolk and State of Massachusetts this 23rd day of Mch. A. D. 1927.

FRED WILLIS GUNN. [L. S.]